United States Patent [19]

Turner

[11] Patent Number: 5,162,407

[45] Date of Patent: Nov. 10, 1992

[54] SILICONE RUBBER SEALANT COMPOSITION

[75] Inventor: Ronald L. Turner, Golden, Colo.

[73] Assignee: Investors Diversified Capital, Inc., Monument, Colo.

[21] Appl. No.: 665,419

[22] Filed: Mar. 6, 1991

Related U.S. Application Data

[63] Continuation-in-part of Ser. No. 489,689, Mar. 6, 1990, abandoned.

[51] Int. Cl.$^5$ .............................................. C08K 5/54
[52] U.S. Cl. ................................ 524/108; 428/319.3; 428/447; 524/89; 524/102; 524/188; 524/266; 524/376; 524/377; 524/385; 524/462; 524/490; 524/491; 524/588
[58] Field of Search ............... 524/588, 490, 491, 376, 524/377, 385, 188, 266, 462, 89, 102, 108; 523/169; 525/477; 428/319.3, 447

[56] References Cited

U.S. PATENT DOCUMENTS

| | | | |
|---|---|---|---|
| 3,304,318 | 2/1967 | Brady | 260/448.2 |
| 3,444,225 | 5/1969 | Boissieras et al. | 260/448.2 |
| 3,589,917 | 6/1971 | Hedlund | 106/12 |
| 3,758,441 | 9/1973 | Nitzche et al. | 525/477 |
| 3,772,065 | 11/1973 | Seller | 117/123 |
| 3,832,319 | 8/1974 | Merrill | 524/376 |
| 3,879,459 | 4/1975 | Burrill | 427/387 |
| 3,935,147 | 1/1976 | Godshalk | 524/462 |
| 4,261,758 | 4/1981 | Wright et al. | 428/447 |
| 4,338,375 | 7/1982 | Hashimoto et al. | 428/447 |
| 4,352,894 | 10/1982 | Schmidt | 521/91 |
| 4,376,149 | 3/1983 | Martin | 428/447 |
| 4,476,155 | 10/1984 | Niemi | 427/387 |
| 4,517,375 | 5/1985 | Schmidt | 428/447 |
| 4,525,213 | 6/1985 | Linn | 106/2 |
| 4,525,400 | 6/1985 | Suprenant | 428/447 |
| 4,544,692 | 10/1985 | Kuziemka | 524/376 |
| 4,546,017 | 10/1985 | Flackett et al. | 427/387 |
| 4,631,207 | 12/1986 | Price | 427/387 |
| 4,672,003 | 6/1987 | Letoffe | 428/447 |
| 4,672,004 | 6/1987 | Chizat et al. | 428/447 |
| 4,704,419 | 11/1987 | Fukayama et al. | 524/188 |
| 4,708,743 | 11/1987 | Schmidt | 106/12 |
| 4,755,579 | 7/1988 | Letoffe | 524/588 |

FOREIGN PATENT DOCUMENTS 1069057 11/1959 Fed. Rep. of Germany.
202446 12/1971 Fed. Rep. of Germany.

OTHER PUBLICATIONS

Anderson, R. et al. (1987) "Silicon Compounds", Register and Review, Petrach Systems, pp. 258-259.
Kirk Othmer Encyclopedia, Chapter "Sealants", Section Silicones.
Kirk Othmer Encyclopedia, Chapter "Silicon Compounds", Section Silicon Elastomers.

Primary Examiner—Veronica P. Hoke
Attorney, Agent, or Firm—Greenlee and Winner

[57] ABSTRACT

A sealant composition especially useful for porous materials such as wood, concrete and mansonry is provided comprising: (a) a silanol-terminated polysiloxane having a molecular weight greater than about 2000; (b) a multifunctional silane having functional groups which condense with silanol groups in the presence of atmospheric moisture at room temperature to form a cross-linked polymer; and (c) a nonaqueous volatile solvent which is non-reactive with components (a) and (b).

The sealant composition renders said materials waterproof by coating and filling in the pores of said material with cured silicone rubber product.

In a preferred embodiment the composition also contains a metal-containing curing catalyst and a volatile or subliming chelating agent in an amount sufficient to prevent cure of the composition in the storage container prior to or during use.

The composition may also comprise adhesion agents, surfactants and pigments.

19 Claims, No Drawings

5,162,407

SILICONE RUBBER SEALANT COMPOSITION

CROSS-REFERENCE TO RELATED APPLICATIONS

This is a continuation-in-part of copending U.S. patent application Ser. No. 07/489,689, filed Mar.6, 1990, now abandoned which is incorporated herein by reference.

FIELD OF THE INVENTION

This invention relates to one-component room temperature vulcanizable (RTV) silicone rubber compositions used as sealants, especially for porous materials such as concrete, wood and masonry. The compositions of this invention include volatile solvents and cure in-situ after application to form waterproof cross-linked rubber sealants filling the pores of said materials. In a preferred embodiment the sealant comprises a volatile or subliming chelating agent in an amount sufficient to prevent activity of the metal-containing curing catalyst prior to application of the sealant to prevent curing in the can.

BACKGROUND OF THE INVENTION

Silicone compositions are known for use in waterproofing porous building materials, however, such compositions have generally involved relatively low molecular weight silicone fluids or oils. Such compounds are described, e.g., in Anderson, R. et al. (1987) "Silicon Compounds, Register and Review," Petrarch Systems, pp. 258–259. These oils, although waterproof, will dissolve and can be removed by appropriate solvents. They can even be physically forced from the pores by high pressure water. Such oils may also wick out of the pores and be absorbed by materials in contact with the impregnated substrate.

Examples of such prior silicone compositions are described in Linn U.S. Pat. No. 4,525,213 which discloses the use of low molecular weight (100–1000) alkylalkoxysilanes in non-alcohol-containing solvents for waterproofing concrete and masonry. These compounds react with the cement paste matrix of the substrate to form stable hydrophobic reaction products.

Seiler U.S. Pat. No. 3,772,065 describes alcoholic solutions of alkyltrialkoxysilanes and their lower oligomers as masonry impregnants.

Schmidt U.S. Pat. Nos. 4,517,375, 4,352,894 and 4,708,743 describe aqueous solutions of silanols prepared by hydrolysis of alkyltrialkoxysilanes as masonry waterproofing agents.

Boissieras et al. U.S. Pat. No. 3,444,225 describes organopolysiloxane derivatives ranging from mobile liquids to highly viscous oils which are stable in ambient air, and which are used as waterproofing and anti-adhesion agents.

Brady U.S. Pat. No. 3,304,318 describes a method for hydrolyzing alkoxysilanes to form siloxanes or silanols.

Hedlund U.S. Pat. No. 3,589,917 describes a method for preventing scaling and spalling of concrete comprising applying to concrete a silane of the formula $QSiX_3$ wherein Q is a hydrocarbon or substituted hydrocarbon radical and X is a readily hydrolyzable radical, or an alkali metal monoalkyl siliconate having 1–4 carbon atoms in the alkyl group.

German Patent Application 2029446 discloses impregnating agents for masonry and inorganic oxides comprising solutions of alkyltrialkoxy silanes or their condensation products with 0 to 2 alkoxy groups per silicon atom in alcohols or hydrocarbons. This agent makes the masonry hydrophobic and preserves its ability to breathe, i.e., does not close the pores.

German Patent 1069057 discloses the use of water-soluble organosiloxanes for impregnating masonry to make it water-repellant, but able to breathe.

One-component room temperature vulcanizable rubber sealants have been known to the art since the 1960s. The Kirk Othmer Encyclopedia, under the Chapter Title, "Sealants," and Section Heading, "Silicones," discloses that these products have a Si-O-Si backbone and cure by exposure to moisture in the air.

One-component room temperature vulcanizable silicone rubbers are further described in the Kirk Othmer Encyclopedia under the Chapter Title "Silicon Compounds, Silicones," Section Heading, "Silicone Elastomers," as comprising fluids with silanol end groups which cure by reactions involving acetoxysilanes. The cure is brought about by contact with moisture in the air. Catalysts may be used to speed the reaction.

Anderson, R. et al. (1987) "Silicon Compounds, Register and Review," Petrarch Systems, pp. 258–259, at page 266 discloses that silanol terminated polydimethylsiloxanes with a molecular weight of 26,000 to 200,000 may be cross-linked with small quantities of multifunctional silanes which condense with the silanol groups. This reference discloses that such silanols are almost never used in fluid applications. The most commonly used multifunctional silanes used in one-component room temperature vulcanizable rubbers are acyloxy, enoxy and oxime silanes.

Product sheets from three compositions manufactured by Petrarch Systems disclose compositions which are silicone rubber compositions in nonaqueous volatile solvents which cure on contact with atmospheric moisture. However, these compounds all have a high percent solids (34% or more), and thus low concentration of volatile solvent (below 66%). These compositions are designed to form a protective film over the substrates rather than penetrate into pores thereof. Protection of the porous substrate using the compositions of this invention is 10 to 20 times better per weight percent solids than using the Petrarch compositions.

None of the foregoing patents disclose or suggest the use of one-component room temperature vulcanizable rubber intermediates in non-aqueous volatile solvents which cross-link in the presence of atmospheric moisture after application to porous materials such as masonry, wood or concrete to fill the pores and form a waterproof seal.

SUMMARY OF THE INVENTION

A sealant composition especially useful for porous materials such as wood, concrete and masonry is provided comprising:

(a) a silanol-terminated polysiloxane having a molecular weight greater than about 2000;

(b) a multifunctional silane having functional groups which condense with silanol groups in the presence of atmospheric moisture at room temperature to form a cross-linked polymer;

(c) a metal-containing catalyst in an amount sufficient to cause said condensation of said mixture in the presence of atmospheric moisture; and (d) a nonaqueous volatile solvent which is non-reactive with the remaining components.

The sealant composition renders said materials waterproof by coating and filling in the pores of said material with cured silicone rubber product.

This composition preferably contains amorphous silica fillers and has a hardness (shore A) of at least about 20, and preferably less than that which makes the product rigid the tensile strength of this composition is at least 250 to about 450 or higher, and an elongation about 300% to about 500%.

Preferably, the composition also comprises a volatile chelating agent, preferably 1,4-dioxane, in amount sufficient to prevent activity of said catalyst so as to prevent curing of the composition in the can prior to application.

Preferably the composition also comprises an adhesion agent and a surfactant.

A method for waterproofing a material, especially a porous building material, is also provided comprising:

(a) applying to said material at room temperature and in the presence of atmospheric moisture, a sealant composition comprising:
  (1) a silanol-terminated polysiloxane having a molecular weight greater than about 2000;
  (2) a multifunctional silane having functional groups which condense with silanol groups of said silanol-terminated polysiloxane under said conditions of temperature and atmospheric moisture to form a cross-linked polymer;
  (3) a metal-containing catalyst in an amount sufficient to cause said condensation of said mixture in the presence of atmospheric moisture;
  (4) a non-aqueous volatile solvent which is non-reactive with the remaining components, at a concentration between that sufficient to provide a viscosity low enough to allow penetration of said composition into the pores of said material and that which will allow effective filling of said pores by said cross-linked polymer after evaporation of said solvent; and (b) allowing said solvent to evaporate and said composition to cross-link such that a waterproof seal of said material is formed.

An improved method comprises adding to said sealant composition a volatile or subliming chelating agent preferably comprising 1,4-dioxane in an amount equimolar to the metal ions in said catalyst and allowing said chelating agent to evaporate after application of said sealant to said material, whereby said condensation is prevented prior to said application, and is permitted after evaporation of said chelating agent.

There is also provided a method for temporarily preventing curing of the one-component room temperature vulcanizable silicone rubber sealant composition prior to application thereof to a substrate, and permitting curing of said composition following application to said substrate wherein said silicone rubber sealant composition comprises:

(a) a silanol-terminated polysiloxane having a molecular weight greater than about 2000;

(b) a multifunctional silane having functional groups which condense with silanol groups in the presence of atmospheric moisture at room temperature to form a cross-linked polymer;

(c) a metal-containing catalyst in an amount sufficient to cause said condensation of said mixture in the presence of atmospheric moisture;

(d) a non-aqueous volatile solvent which is non-reactive with the remaining components at a concentration of at least about 85%;

(e) comprising adding to said composition comprising adding to said composition a volatile or subliming chelating agent in an amount sufficient to prevent activity of said catalyst, whereby curing of said composition occurs upon evaporation of said chelating agent and consequent release of said catalyst after application to said substrate.

Preferably said chelating agent comprises 1,4-dioxane in an amount at least equimolar to the metal atoms in said catalyst.

DETAILED DESCRIPTION OF THE PREFERRED EMBODIMENTS

The sealant composition of this invention is a one-component RTV silicone rubber solubilized or suspended in a nonaqueous volatile solvent comprising a silanol-terminated polysiloxane, a multifunctional silane, a metal-containing curing catalyst, and the solvent, and also optionally including an adhesion agent and/or a surfactant. In a preferred embodiment, the sealant includes a volatile or subliming chelating agent to tie up the metal atoms in the catalyst and prevent curing of the composition in its storage container.

When applied to a porous substrate, such as wood, masonry or concrete, the solution penetrates, carrying the uncured rubber into the interstices of the porous substrate. As the solvent evaporates, the silicone rubber is deposited in the pores and interstices of the porous substrate. After drying (and to some degree during the solvent evaporation), the material cures by chemical reaction, forming a stiff insoluble rubber compound interspersed throughout the substrate. The substrate becomes waterproof or water resistant, because of the water repellency of the silicone.

Unlike silicone oils which have previously been used for such purposes, the material of this invention is molecularly bonded to itself to form very large molecules which extend through the substrate and are thereby locked into the substrate. It is extremely difficult to remove this material from a porous substrate, other than by cutting away the portion containing the silicone. For most substrates, a chemical method of removal of the silicone rubber would destroy the substrate before attacking the rubber.

The silanol-terminated polysiloxane component of the composition of this invention is a polymer having a Si-O-Si backbone terminating with at least one OH group. The silicone molecules may have substituents such as alkyl groups, or substituents which participate in the cross-linking reactions with the silanol groups, such as acetoxy, enoxy amine, oxime and alkoxy, as is understood in the art. Preferably, the silanol-terminated polysiloxane is a silanol-terminated polydimethylsiloxane. These polysiloxanes have a molecular weight greater than about 2000 and up to about 300,000, and more preferably sufficiently high to be classified as gum rather than liquid, e.g., about 26,000 and above, with a preferable upper limit of about 200,000.

The multifunctional silane is preferably an acyloxy, enoxy or oxime silane, more preferably an acetoxy silane. Any multifunctional silane may be used having as substituents reactive group which condense with the OH groups of the silanol-terminated polysiloxane in the presence of atmospheric moisture to form a branched, cross-linked polymer, all as understood by those skilled in the art. The percentage of silane in the mixture should be sufficient to crosslink the polysiloxane so as to form a rubbery mass by producing a tangled chain with occasional cross-linked "bridges." As is understood by those skilled in the art, too much silane can make the cured composition hard and brittle, and too little will not allow the mixture to become solid and firm. A preferred percentage of silane to polysiloxane is about 0.1%, and more preferably about 1% to about 5%. Preferably the silane is one which forms reaction products with the polysiloxane which are non-toxic and non-corrosive.

Silicone oils of high viscosity, e.g., up to about 30,000 to 60,000 c.s., can be used to provide inexpensive water repellency to the products and can be used in an amount up to but not exceeding the amount of the other ingredients, so long as the ability to achieve a firm set is not interfered with. A preferred amount of such oils is about 1-2% of the total composition or less.

In a preferred embodiment, the silanol-terminated polysiloxane and multifunctional silane are respectively a silanol-terminated polydimethyl siloxane (Chemical Abstracts No. 70131-67-8, incorporated herein by reference), and methyltriacetoxysilane (Chemical Abstracts No. 4253-34-3, incorporated herein by reference) as contained in General Electric Company CRTV 5110, a commercially-available one-component RTV silicone rubber intermediate mix. Product information about this product is as follows:

| Typical Uncured Properties | |
|---|---|
| Color | Translucent |
| Consistency | Pourable |
| Solids Content | Contains no solvent |
| Non-volatiles, % (24 hrs/158° F.) | 97% (min.) |
| Flow | Self leveling, 4" in 12 sec. |
| Viscosity | 25,000-35,000 |
| Tack Free Time (77° F., 50% R.H.) | 30 minutes |
| Application Rate gm/min. (Semco gun with #440 nozzle 0.125 orifice) Gun pressure 90 ± 2 psi | 600 |
| Specific Gravity | 1.05-1.07 |

| Typical Cured Properties | | | |
|---|---|---|---|
| Properties (ASTM pressed sheets cured at 77° F. and 50% R.H.) | 24 Hrs. RT | 2 Days RT | 7 Days RT |
| Hardness, Shore A | 22 | 25 | 27 |
| Tensile Strength, psi | 450 | 500 | 520 |
| Elongation, % | 430 | 400 | 350 |
| Tear Strength, Die B, lb/in. | 33 | 33 | 33 |
| Linear Shrinkage, % | .3 | .3 | .3 |

Acceleration of Cure

Acceleration of cure is accomplished by increasing either the temperature or humidity or both.
A desirable condition for acceleration is a temperature range between 130° F. and 140° F. with a humidity (RH) between 70% and 80%.

The non-aqueous volatile solvent must be non-reactive with the silane and the polysiloxane and other active ingredients. The purpose of this solvent is to dilute the silane/polysiloxane composition by dissolving or suspending it to create an easily spreadable composition having a viscosity suitable for application to the substrate. Unless the composition includes the volatile or subliming chelating agent described herein to prevent curing in the can, the solvent should not contain water and the sealant composition should be kept scrupulously dry, such as by sealing, to prevent contact with atmospheric moisture until ready to use in order to prevent premature cross-linking of the components and degradation of the product.

With a low concentration of the silane/polysiloxane mixture in the solvent, very extensive penetration of substrates which are porous materials by the sealant composition can be obtained, but with less effective filling of the pores once the solvent has evaporated and the rubber has cured. On the other hand, a very high concentration may provide a surface layer with little penetration of the porous material. To be used on material with large pores, such as lightweight masonry or weathered wood, a higher concentration of the silane/polysiloxane mixture can be advantageous. On very dense materials such as concrete or fired brick, a lower concentration is better, because it penetrates better and because not so much rubber is needed to fill the small pores of brick or concrete. Preferably the concentration of the silane/polysiloxane mixture in the volatile solvent is about 2% to about 33% by weight. Concentrations of the silane/polysiloxane mixture lower than about 2% give some protection, but are not nearly as effective on most substrates as somewhat higher concentrations. Better performance is obtained if the concentration of the silane/polysiloxane mixture is between about 5% and about 15%.

The concentration of the solvent in the sealant composition, therefore, should be between that sufficient to provide a viscosity low enough to allow penetration of said composition into the pores of said material and that which will allow effective filling of said ports by said cross-linked polymer after evaporation of said solvent, preferably at least about 66%, more preferably at least about 85%, and more preferably, between about 85% and about 93%.

The solvent should be a volatile one which readily evaporates at room temperature after application to the substrate allowing the silane/polysiloxane mixture to cross-link upon contact with atmospheric mixture into a solid polymer. Preferably the solvent has a boiling point between about 50° C. and about 325° C., more preferably between about 180° C. and about 275° C., and most preferably between about 180° C. and about 225° C.

The solvent should be one in which the silane/polysiloxane mixture continues to be soluble or suspended as the remaining solvent evaporates, until curing takes place and no further segregation of the solvent/solute is likely. Useful solvents include petroleum fractions such as standard solvent and naphtha; alcohols, particularly $C-C_4$ alcohols, such as methyl, ethyl, propyl, isopropyl, butyl, isobutyl and tert-butyl alcohols; esters including $C-C_4$ esters, such as ethyl acetate, methyl acetate, and propyl acetate; chlorinated hydrocarbons such as 1,1,1-trichloroethane, perchloroethylene triohloromethane, methylene dichloride and other halogenated hydrocarbons such as freons; aromatic hydrocarbons such as toluene, xylene and ethyl benzene; aliphatic hydrocarbons such as hexane, heptane and cyclohexane; glycol ethers such as the ethylene glycolmethyl ether, ethylene glycol butyl ether; proprietary solvents such as Cellosolve, a product of Union Carbide, or Dowanol, a product of Dow Chemical Company; and ketones such as dimethyl ketone and ethyl methyl ketone. Mixtures of the foregoing solvents may also be used.

Preferably the solvent is one which is non-toxic and meets environmental regulations. Examples of such preferred solvents are Stoddard solvent, aliphatic hydrocarbons, glycol ethers, propyl alcohol and ethyl alcohol. Other factors to be balanced in choosing a solvent for use in the composition of this invention include flash point, as materials with low flash points, e.g., less than about 100-120° F., are less preferred for consumer application. Tendency to absorb water is also a factor in choosing an appropriate solvent, as the presence of water in the composition prior to application causes premature cross-linking and tends to degrade the product. Care must be taken to ensure that the solvent does not contain water before mixing. Dehydrating agents known to those skilled in the art, e.g., silica gel and sodium sulfate, may be used for this purpose. When commercially available glycol ethers such as Cellosolve and Dowanol are used, for example, these must be dried first. However, this factor becomes less important when the volatile or subliming chelating agents of this invention are used to prevent premature curing.

Despite their low flash points and tendency to absorb water, alcohols are preferred solvents because they are cheaper than some alternative solvents. Methanol and ethanol are renewable resources. Another advantage, particularly with ethanol, and to a lesser degree with propanol, is the relatively low toxicity of these materials; human health hazard due to vapors of evaporating solvent are thus minimized. Additionally, because lower alcohols are miscible with water, a product formulated with alcohol provides better penetration of a porous substrate which may not be scrupulously dry than solvents which are totally immiscible with water.

Catalysts are also used to enhance the reaction. Tin soaps are effective catalysts. The catalyst should be one, as will be appreciated by those skilled in the art, which enhances the rate of condensation reactions. In the RTV silicone rubbers, metal soaps are often used as catalysts to accelerate the cure. These metal organic compounds probably function by facilitating hydrogen transfer. Tin soaps, zinc soaps, and other metal soaps or metal salts of carboxylic acids, tin octooctoate and titanates serve in this function.

In a preferred embodiment, the sealant composition also contains a volatile or subliming metal chelating agent which ties up the metal atoms in the catalyst so as to prevent curing of the composition while in its storage container prior to application. Previous compositions had to be used immediately upon opening because they began to cure on contact with atmospheric moisture. However, when the volatile or subliming chelating agents of this invention are present, the composition may be opened for use, closed and reused later. Applicant successfully allowed his compositions containing said chelating agent to evaporate to one-half volume in the container without curing.

The volatile or subliming chelating agent should be one that evaporates or sublimes at room temperature after application at about the same rate as the volatile solvents of this invention for convenience in use; however, if the chelating agent is slower or faster in dissipating than the solvent this will not interfere with the curing reaction.

The chelating agent should preferably be present in an amount at least sufficient to tie u all metal atoms in the catalyst to prevent catalyzation of the cure reaction. Generally, amounts of chelating agent of at least about 0.01% weight of the solvent will be useful, preferably an amount at least equimolar to the metal atoms in the catalyst is used, and more preferably, excess chelating agent is used, e.g., 1 or 2 weight percent, so as to provide protection against curing even after some preferential evaporation of the chelating agent in the container has occurred. Up to one hundred times the molar amount of catalyst metal of chelating agent may advantageously be used.

Any volatile or subliming (i.e., capable of substantially dissipating within a few hours application to the substrate, preferably at about the same rate as the volatile solvent) chelating agent may be used. Suitable chelators include orthophenanthroline, $\alpha$-$\alpha'$-dipyridyl and 1,4-dioxane, or mixtures thereof.

In a preferred embodiment, the sealant composition contains, in addition to the silanol-terminated polysiloxane and multifunctional silane in the volatile solvent, an adhesion agent to aid in bonding of the cross-linked sealant to the substrate. For this purpose organofunctional silanes which form molecular bonds with the substrate and also with the cured silicone rubber polymer are useful. A preferred adhesion agent is vinyl tris(2-methoxyethoxy)silane produced commercially by Union Carbide under the trade name "A-172." Other such compounds are those which are known to the art to form molecular bonds between the particular substrate and the polymer, such asmercapto functional silanes, e.g., A-189 of Union Carbide, consisting of gamma mercap to propyl trimethoxy silane; and amino functional silanes such as A-11 of Union Carbide, consisting of gamma amino propyl triethoxy silane.

The adhesion agent should be present in an amount providing improvement in adhesion properties without interfering with cross-linking of the polysiloxane/silane mixture, preferably between about 0.1% to about 5% by weight, and preferably about 0.2%.

Also in a preferred embodiment of this invention, a surfactant is included in the mixture. RTV rubber tends to migrate and separate during the evaporation stage of the curing. Although the coating is still effective, there can be isolated regions which are less well protected due to this migration. If the protective coating is applied to a smooth, non-porous substrate, such as glass, this tendency to migrate and produce an uneven coating is quite pronounced. Unexpectedly, it was found that the addition of certain surfactants, especially fluorocarbon surfactants, was effective in diminishing or entirely eliminating the tendency of the components to migrate and separate. A preferred surfactant is the 3M product FC-430, a proprietary non-ionic fluorochemical liquid surfactant. Another useful surfactant is FC-740 of 3M, a non-ionic fluoroaliphatic polymeric ester.

The concentration of the surfactant depends on the exact compound used as well as the intended application, and can be determined without undue experimentation by those skilled in the art. The concentration should be high enough to effectively prevent migration of the curing components but not so high as to cause undesirable foaming action when the product is brushed or shaken. A preferred concentration of FC-430 is between about 0.01% to about 0.1% by weight, more preferably between about 0.03% and about 0.07%, and most preferably about 0.06%.

Pigments may be added to the composition if desired so long as they are suspendible in the mixture and do not adversely react with the other components thereof or change the properties of the cured rubber product. A number of pigments are suitable, as will be appreciated by those skilled in the art, including aluminum powder, lamp black and pigments opaque to ultraviolet light which serve to protect substrates such as wood degradable by ultraviolet light.

The following examples are provided for purposes of illustration and not by way of limitation of the invention which is defined by the terms of the appended claims, included equivalents which would be apparent to those skilled in the art.

EXAMPLES

EXAMPLE 1

In a series of experiments, mixtures containing 2.9, 7, and 25% Silicone Rubber in Stoddard Solvent were applied to thin pine sticks and allowed to cure overnight, and weighed. Each stick was then soaked in pure water for one minute, then wiped dry for 30 seconds with dry paper towels and weighed. The water uptake was calculated as a percent of the pine stick weight, and was found to vary with the percentage concentration of the silicone rubber in the solvent. The test results follow:

| Percent Silicone Rubber in Solvent | Percent Water Absorbed |
|---|---|
| 0 | 8.2 |
| 2.9 | 3.3 |
| 7 | 1.5 |
| 25 | 1.0 |

The Percent Water Absorbed can be estimated using a logarithmic equation:

$$\text{Percent Water Absorbed} = 3.9 - 0.95 \ln(\% \text{ Silicone}),$$

with a regression coefficient of 0.99. This exact equation will hold only for the identical wood splints, under identical test conditions, but it does show the general type of results which could be expected under other test conditions. The higher concentration of silicone rubber will give better moisture protection, but with diminishing improvement with continued increase in concentration.

EXAMPLE 2

The use of alcohol in the product of this invention was found to be technically quite acceptable, forming excellent deposits of well bonded waterproof silicone rubber on curing. In one test excellent results were obtained using a solvent consisting of 31% isopropanol and 69% Stoddard solvent.

EXAMPLE 3

In this Example, the usefulness of surfactants is demonstrated. In one test, using 0.06% of 3M product FC-430 in the product, vs without any surfactant, the two products were applied side by side on clean glass and allowed to dry naturally. After one day the sample with no surfactant had dried, but was separated into an oily zone and a dry powdery region. The sample with the surfactant gave no such separation on drying, and produced a uniform clear, smooth coating of firm rubber over the entire application region.

EXAMPLE 4

Formulas for preferred sealant materials of this invention are given below:

| Ingredient | Volume Percent |
|---|---|
| FORMULA 1 | |
| Naphtha | 93.0 |
| GE RTV 110 | 5.5 |
| Silicon oil 60K cs | 0.6 |
| A-172 | 0.08 |
| FC-430 | 0.05 |
| 1,4-Dioxane | 0.8 |
| α-α'-Dipyridyl | 0.1 |
| FORMULA 2 | |
| 1,1,1-trichloroethane | 93.0 |
| RTV 110 | 5.5 |
| Silicon oil 60K cs | 0.6 |
| A-172 | 0.08 |
| FC-430 | 0.05 |
| 1,4-Dioxane | 0.8 |
| α-α'-Dipyridyl | 0.08 |

The FC-430 is a product of 3M Corporation
The A-172 is a product of Union Carbide Corporation The formula is mixed by stirring the solvent while adding the silicone gum to the Stoddard solvent in thin streams, avoiding high shear (whipping air into the mixture). Stirring is continued until all material appeared uniform. Exposure to moisture in air is minimized during this mixing step. When the material is evenly dispersed, FC-430 and the A-172 are added and stirred for several more minutes.

EXAMPLE 5

Various solvents were tested with a one-part acetoxy silicone rubber intermediate manufactured by Rhone-Poulenc (R-222). Product information regarding this composition is as follows: Unaffected by sunlight, rain, snow, ozone and temperature extremes. Does not crack or become brittle with age. Nonstaining and nonfading. Meets or exceed the requirements of the following federal specifications: TT-S-001543A (COM-NBS) Class A—Federal Specifications for Silicone Building Sealants; TT-S -00230C (COM-NBS) Class A, on-Sag—Federal Specifications for One-component Silicone Sealants; ASTM C920-79—Standard Specification for Elastomeric Joint Sealants as Type S, Grade NS, Class 25, Use NT, C and A; CGSB 9GP9M (Canadian Government Specification Board); When properly cured, meets the requirements of FDA regulation number 21 CFR 77.2600.

The formulas of these mixtures are given below, together with some of the test results for these mixtures.

8.21% of silicone rubber was dissolved in 91.5% of Stoddard Solvent, 0.05% of FC-430 was added, followed by 0.23% of A-172. A cedar test coupon was coated with this material and allowed to cure 72 hours. The coupon was then dried in the oven at 40° C. for 8 hours, allowed to cool, and soaked in pure water. After ten minutes, the coupon had absorbed 6.7% as much water as a reference coupon which was dried but had no repellent treatment. After one hour soaking, the coupon absorbed 13% as much water as the untreated coupon, and after 16 hours, it had absorbed 30% as much water as the untreated coupon.

4.23% of silicone rubber intermediate was dissolved in 90.5% of Stoddard Solvent, 0.03% of FC-430 dissolved in 5% of dried Ethanol was added, followed by 0.18% of A-172. A cedar test coupon was coated with this material and allowed to cure 72 hours. The coupon was then dried in the oven at 40° C. for 8 hours, allowed to cool, and soaked in pure water. After ten minutes, the coupon had absorbed 6.8% as much water as a reference coupon which was dried but had no repellent treatment. After one hour soaking, the coupon absorbed 13.3% as much water as the untreated coupon, and after 16 hours, it had absorbed 30% as much water as the untreated coupon.

3.69% of silicone rubber intermediate was dissolved in 88.1% of Stoddard Solvent, 0.03% of FC-430 dissolved in 5.3% Ethanol was added, followed by 0.18% of A-172. 2.72% of high viscosity silicone oil (60000 centistokes) was added. A cedar test coupon as coated with this material and allowed to cure 72 hours. The coupon was then dried in the oven at 40° C. for 8 hours, allowed to cool, and soaked in pure water. After ten minutes, the coupon had absorbed 6.5% as much water as a reference coupon which was dried but had no repellent treatment. After one hour soaking, the coupon absorbed 12.5% as much water as the untreated coupon, and after 16 hours, it had absorbed 27% as much water as the untreated coupon.

7.27% of S-222 was dissolved in 77.4% Methyl Ethyl Ketone and 15.3% of Stoddard Solvent. A cedar test coupon was soaked with this material and allowed to cure 72 hours. The coupon was soaked in pure water. After ten minutes, the coupon had absorbed 5% as much water as a reference coupon which had no repellent treatment. After 1½ hours soaking, the coupon absorbed 15.3% as much water as the untreated coupon, and after 29 hours, it had absorbed 55% as much water as the untreated coupon.

6.12% of silicone rubber intermediate was dissolved in 82.4% Isopropyl Acetate and 11.5 of Stoddard Solvent. A cedar test coupon was soaked with this material and allowed to cure 72 hours. The coupon was soaked in pure water. After ten minutes, the coupon had absorbed 4.7% as much waster as a reference coupon which had no repellent treatment. After 1½ hours soaking, the coupon absorbed 15% as much water as the untreated coupon, and after 29 hours, it had absorbed 59% as much water as the untreated coupon.

7.85% of silicone rubber intermediate was dissolved in 70.3% Methylene Chloride and 21.8% of Stoddard Solvent. A cedar test coupon was soaked with this material and allowed to cure 72 hours. The Coupon was soaked in pure water. After ten minutes, the coupon had absorbed 4.4% as much water as a reference coupon which had no repellent treatment. After 1½ hours soaking, the coupon absorbed 12.2% as much water as the untreated coupon, and after 29 hours, it had absorbed 41.4% as much water as the untreated coupon.

5.74% of silicone rubber intermediate was dissolved in 40.2% pre-dried Ethylene Glycol Butyl Ether, 17.2% of Methylene Chloride and 36.9% of Stoddard Solvent. A cedar test coupon was soaked with this material and allowed to cure 72 hours. The coupon was soaked in pure water. After one minute, the coupon had absorbed 5.9% as much water as a reference coupon which had no repellent treatment. After ¼ hours soaking, the coupon absorbed 20.5% as much water as the untreated coupon absorbed in ten minutes.

EXAMPLE 6

A comparison was made of an embodiment of the present invention having the following formula:

| | |
|---|---|
| Trichloroethane | 95 wt. % |
| Rhone-Poulenc 222 Intermediate | 4.5 wt. % |
| Silicone Oil (60,000 cs) | 0.4 wt. % |
| FC-430 (3M Corp.) | 0.02 wt. % |
| A-172 (Union Carbide) | 0.07 wt. % | with Petrarch Products SE and FF. These Petrarch Products are described as follows:

Petrarch SE

Petrarch SE is utilized to protect delicate microelectronic devices, provide conformable seals and gaskets. It overcoats silicone rubber and other plastic part providing greater comfort during body contact. Byproducts of cure are nonacidic.

Petrarch SE is a single component solvent dispersion of a silicone elastomer prepolymer. It cures by activation of a silane catalyst by atmospheric moisture and evaporation of a naphtha vehicle.

| Cured Properties | |
|---|---|
| Color | Clear |
| Durometer, Shore A | >5 |
| Tensile Strength | >50 psi |
| Elongation | >150% |
| Tear Strength | >5 pli |
| Uncured Properties | |
| Form | Clear solution |
| Viscosity | 100-150 ctsks |
| Specific gravity | 0.81 |
| Percent solids | 35% |
| Skin over time, minutes | 15 |
| Cure time (10 mils) | 2 hours |
| Flash Point | 12° C. |

Petrarch SE is applies by dipping or brushing parts. Solvent is removed by ambient or forced air evaporation. The maximum recommended coat thickness is 10 mils. Greater film thickness can be achieved by additional dips following solvent evaporation. Once containers are opened they must be purged with dry air or nitrogen to prevent gelation.

Petrarch FF

Petrarch FF is a source of filler-free silicone rubber in a tough bulk film form. It exhibits high bond strength to a wide range of substrates including other silicones, silica, metals and solvent compatible plastics and fibers. In biomedical equipment, Petrarch FF coatings reduce physiological interaction including protein adsorption and clot initiation. In optical devices it provides a clear mechanical barrier that seals and gaskets without scratching or initiating notch failure.

Petrarch FF is a moisture-activated silicone RTV dispersed in a solution of tetrahydrofuran/dioxane. In the presence of atmospheric moisture a condensation of silicone prepolymers to a high molecular weight rubber occurs. The byproduct of the reaction is acetic acid, which imparts a vinegar-like odor. The system is designed for wet out and adhesion to polar substrates.

| Cured Properties | |
|---|---|
| Tensile Strength | >100 psi |
| Elongation | >150% |
| Durometer, Shore A | >8 |
| Tear Strength | >5 pli |
| Uncured Properties | |
| Percent solids | 48-52% |
| Viscosity | 350-400 ctsks |

| | |
|---|---|
| Specific gravity | 0.97 |
| Skin over time | 30-45 minutes |
| Cure time (10 mls) | 6-8 hours |
| Flash Point | 0° |

Petrarch FF is applied by dipping or brushing. Solvent is allowed to evaporate. Cure is at room temperature.

The three products were tested together for comparison. Cedar coupons 2" square, about ≳" thick, were soaked for 30 seconds in each product, then wiped off with a soft cloth and allowed to cure for three days. The weight gain due to the cured rubber in the wood was measured. The weight of the original product necessary to provide that much rubber was also calculated, and these weights were related to the original weight of the wood coupons.

The coupons were soaked in water for one minute, then wiped dry of surface moisture with a soft cloth. After one minute conditioning, the weight of water taken up by the coupons was measured. The water was related to the original weight of the coupon, and to the weight of the absorbed rubber. A control coupon (untreated) was included in the tests. The results of the measurements and calculations are given in the Table:

| | Petrarch FF | Petrarch SE | Lifetime Commercial | Control |
|---|---|---|---|---|
| Coupon weight | 10.155 | 7.669 | 3.45 | 10.778 |
| Weight of cured product | .3456 | .1335 | .0369 | — |
| Solids content of product | 49.1 | 33.0 | 8.0 | — |
| Weight of raw product | .704 | .405 | .527 | — |
| Water absorbed | .0313 | .0213 | 0.0314 | 1.0054 |
| Water as % of coupon weight | .31 | .28 | .39 | 9.3 |
| Weight of solids per wt. of water | 11.0 | 6.27 | .51 | — |

The two Petrarch products are much higher in solids content, i.e., much lower in solvent concentration which is approximately 100% minus percent solids, than the claims made for the sealants of this invention. They are also much higher in viscosity, which retards penetration into porous substrates. During the application of the SE and FF products, it was noted that they tended to remain on the surface. When the surface coating is allowed to dry and then cure, a water resistant coating results. Such coating is far more susceptible to damage through erosion, abrasion or other light physical damage, as well as by exposure to temperature extremes.

The product of this invention, on the other hand, penetrates instantly into a porous substrate, and following drying provides thorough protection. It cannot be abraded off the substrate, since it is throughout the material, and it is protected from degradation due to UV exposure or other weathering effects by being internal, rather than a surface coating.

Similar protection from water absorption was obtained for the short treatment with all three products. However, the protection obtained per unit weight of cured product is far greater with the penetrating sealant, with over twenty times as much solids being required for the FF, and over ten times as much for the SE products, as for the product of this invention. This reflects the fact that the water repellent nature of the material is throughout the body of the test coupon, rather than just on the surface. By repeated applications, the pores can be entirely filled by use of the penetrating sealer, but only the surface can be entirely filled using the coating sealers.

Petrarch Product SS is described as follows:

Petrarch SS

Petrarch SS provides clear, cured films where the highest level of purity and the lowest irritation and toxicity potential are required. The product develops good adhesion to silicone substrates.

Petrarch SS is a filler-free moisture curable silicone rubber dispersed in an ordorless volatile silicone solvent. It is free of any acid or basic (nitrogenous) by-products.

| Cured Properties | |
|---|---|
| Color | Clear |
| Hardness, Shore A | 15 |
| Tensile Strength | 50-100 psi |
| Elongation | 150-200% |
| Refractive Index | 1,400-1,410 |
| Uncured Properties | |
| Percent Solids | 34-38% |
| Viscosity | 100-250 ctsks |
| Specific Gravity | 0.83 |
| Skin-over time | 1-2 hours |
| Cure time | 8 hours |
| Flash point | 0° |

Application is accomplished by dipping, brushing, or spraying, the solvent is removed by evaporation. The film is allowed to cure under normal ambient conditions, 20° -27° C., 20-70% relative humidity.

These findings with respect to Petrarch products SE and FF, indicate that Petrarch Product SS (which is unavailable from the manufacturer) having a percent solids listed as 34-38%, would have properties similar to the SE product, and provide protection in the range of 1/10 that of the penetrating sealants of this invention.

What is claimed:

1. A sealant composition for porous materials comprising:
   (a) a silanol-terminated polysiloxane having a molecular weight greater than about 2000;
   (b) a multifunctional silane having functional groups which condense with silanol groups in the presence of atmospheric moisture at room temperature to form a cross-linked polymer wherein said silane is selected from the group consisting of an acetoxysilane, an enoxy silane and an oxime silane in an amount sufficient to crosslink said polysiloxane;
   (c) a metal-containing catalyst in an amount sufficient to cause said condensation of said mixture in the presence of atmospheric moisture;
   (d) a non aqueous volatile solvent which is non reactive with the remaining components at a concentration of at least about 85% weight percent of the silane/polysiloxane/solvent mixture.

2. A sealant composition for porous materials comprising:
   (a) a silanol-terminated polysiloxane having a molecular weight greater than about 2000;
   (b a multifunctional silane having functional groups which condense with silanol groups in the presence of atmospheric moisture at room temperature to form a cross-linked polymer;

(c) a metal-containing catalyst in an amount sufficient to cause said condensation of said mixture in the presence of atmospheric moisture;

(d) a nonaqueous volatile solvent which is nonreactive with the remaining components at a concentration of at least about 85 weight percent of the silane/polysiloxane/solvent mixture; and (e) a volatile or subliming chelating agent in an amount sufficient to prevent activity of said catalyst.

3. The composition of claim 2 wherein said polysiloxane has a molecular weight greater than about 26,000.

4. The composition of claim 2 wherein said chelating agent is selected from the group consisting of 1,4-dioxane, α-α'dipyridyl, orthophenanthroline, and mixtures of two or more of said chelating agents.

5. The composition of claim 2 wherein said chelating agent comprises 1,4-dioxane.

6. The composition of claim 4 wherein said chelating agents is present in at least an amount equimolar to the metal atoms in said catalyst.

7. The composition of claim 2, wherein said volatile solvent comprises stoddard solvent.

8. The composition of claim 2 wherein said volatile solvent comprises an alcohol.

9. The composition of claim 2 wherein said volatile solvent comprises 1,1,1-trichloroethane.

10. The composition of claim 2 wherein said volatile solvent comprises an aliphatic hydrocarbon.

11. The composition of claim 2 wherein said volatile solvent comprises a glycol ether.

12. The composition of claim 2, wherein said solvent is at a concentration between about 85 and about 97 weight percent of the silane/polysiloxane/solvent mixture.

13. The composition of claim 2 also comprising an organofunctional silane adhesion enhancer.

14. The composition of claim 2 also comprising surfactant.

15. A sealant composition for porous materials comprising:

(a) silanol-terminated polydimethylsiloxane;

(b methyltriacetoxysilane in an amount sufficient to crosslink said silanol-terminated polydimethylsiloxane;

(c) a metal-containing catalyst in an amount sufficient to cause said condensation of said mixture in the presence of atmospheric moisture;

(d) a volatile or subliming chelating agent comprising 1,4-dioxane in an amount equimolar to the metal ions in said catalyst; and (e) a non aqueous volatile solvent selected from the group consisting of compositions which are non reactive with components (a) and (b) consisting of $C_1$-$C_5$ alcohols, glycol ethers, stoddard solvent, aliphatic hydrocarbons at a concentration of at least about 85 weight percent of the silane/polysiloxane/solvent mixture.

16. A method for waterproofing a porous material comprising:

(a) applying to said material at room temperature and in the presence of atmospheric moisture, a sealant composition comprising:

(1) a silanol-terminated polysiloxane having a molecular weight greater than about 2000;

(2) a multifunctional silane having functional groups which condense with silanol groups in the presence of atmospheric moisture at room temperature to form a cross-linked polymer;

(3) a metal-containing catalyst in an amount sufficient to cause said condensation of said mixture in the presence of atmospheric moisture;

(4) a non-aqueous volatile solvent which is non-reactive with the remaining components at a concentration of at least about 85 weight percent of the silane/polysiloxane/solvent mixture;

(b) allowing said solvent to evaporate and said composition to cross-link such that a waterproof seal of said material is formed.

17. The method of claim 16 wherein said volatile or subliming chelating agent comprises 1,4-dioxane in an amount equimolar to the metal ions in said catalyst and allowing said chelating agent to evaporate after application of said sealant to said material, whereby said condensation is prevented prior to said application, and is permitted after evaporation of said chelating agent.

18. A method for temporarily preventing curing of the one-component room temperature vulcanizable silicone rubber sealant composition prior to application thereof to a substrate, and permitting curing of said composition following application to said substrate wherein said silicone rubber sealant composition comprises:

(a) a silanol-terminated polysiloxane having a molecular weight greater than about 2000;

(b) a multifunctional silane having functional groups which condense with silanol groups in the presence of atmospheric moisture at room temperature to form a cross-linked polymer;

(c) a metal-containing catalyst in an amount sufficient to cause said condensation of said mixture in the presence of atmospheric moisture; p1 (d) a non-aqueous volatile solvent which is non-reactive with the remaining components at a concentration of at least about 85 weight percent of the silane/polysiloxane/ solvent mixture;

said method comprising adding to said composition a volatile or subliming chelating agent in an amount sufficient to prevent activity of said catalyst, whereby curing of said composition occurs upon evaporation of said chelating agent and consequent release of said catalyst after application to said substrate.

19. The method of claim 18 wherein said chelating agent comprises 1,4-dioxane.

* * * * *